United States Patent
Bergqvist et al.

(10) Patent No.: US 10,701,712 B2
(45) Date of Patent: Jun. 30, 2020

(54) ON-DEMAND SYSTEM INFORMATION REQUESTS AND TRANSMISSIONS

(71) Applicant: Telefonaktiebolaget LM Ericsson (publ), Stockholm (SE)

(72) Inventors: Jens Bergqvist, Linköping (SE); Rui Fan, Beijing (CN); Janne Peisa, Espoo (FI); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/088,335

(22) PCT Filed: Mar. 22, 2018

(86) PCT No.: PCT/EP2018/057260
§ 371 (c)(1),
(2) Date: Sep. 25, 2018

(87) PCT Pub. No.: WO2018/172446
PCT Pub. Date: Sep. 27, 2018

(65) Prior Publication Data
US 2019/0261390 A1   Aug. 22, 2019

(30) Foreign Application Priority Data
Mar. 24, 2017   (WO) ................ PCT/CN2017/078195

(51) Int. Cl.
*H04W 72/12*   (2009.01)
*H04W 76/27*   (2018.01)
(Continued)

(52) U.S. Cl.
CPC ....... *H04W 72/1236* (2013.01); *H04L 1/0002* (2013.01); *H04L 1/0026* (2013.01);
(Continued)

(58) Field of Classification Search
CPC ......... H04W 72/0453; H04W 72/1226; H04W 72/1236; H04W 48/14; H04L 1/0002; H04L 1/0026
See application file for complete search history.

(56) References Cited

U.S. PATENT DOCUMENTS

2012/0163305 A1   6/2012   Nimbalker et al.
2015/0256995 A1*  9/2015   Rune .................... H04W 48/12
                                                             455/418
(Continued)

OTHER PUBLICATIONS

Samsung, "On Demand SI-UE Energy Consumption Analysis", R2-166068, 3PP TSG-RAN WG2 95bis Kaohsiung, Taiwan, Oct. 10-14, 2016 (Year: 2016).*
(Continued)

*Primary Examiner* — Gary Mui
(74) *Attorney, Agent, or Firm* — Coats & Bennett, PLLC

(57) ABSTRACT

A network node (110) provides a first system information set to a radio device (120), The network node (110) also signals a limitation to the radio device (120). The limitation specifies a condition for requesting a second system information set from the network node (110). Correspondingly, the radio device (120) receives the first system information set and the limitation from the network node (110), and may, for example, determine whether or not to transmit a request for the second system information set based on detecting that the condition is or is not met, respectively.

22 Claims, 6 Drawing Sheets

(51) Int. Cl.
*H04L 1/00* (2006.01)
*H04W 48/14* (2009.01)
*H04W 72/04* (2009.01)

(52) U.S. Cl.
CPC ....... *H04W 48/14* (2013.01); *H04W 72/0453* (2013.01); *H04W 72/1226* (2013.01); *H04W 76/27* (2018.02)

(56) References Cited

U.S. PATENT DOCUMENTS

| | | | |
|---|---|---|---|
| 2016/0234735 A1* | 8/2016 | Kubota | H04W 48/14 |
| 2016/0234736 A1* | 8/2016 | Kubota | H04W 36/0083 |
| 2018/0049107 A1* | 2/2018 | Johansson | H04W 48/10 |
| 2018/0124601 A1* | 5/2018 | Vutukuri | H04W 48/14 |
| 2018/0199267 A1* | 7/2018 | Lin | H04W 48/14 |
| 2018/0270865 A1* | 9/2018 | Mallick | H04W 74/0833 |
| 2018/0279377 A1* | 9/2018 | Lin | H04W 72/0406 |
| 2018/0302844 A1* | 10/2018 | Liu | H04W 48/12 |
| 2019/0158988 A1* | 5/2019 | Lee | H04W 4/70 |
| 2019/0174554 A1* | 6/2019 | Deenoo | H04W 80/02 |
| 2019/0223094 A1* | 7/2019 | Ingale | H04W 48/14 |
| 2019/0261421 A1* | 8/2019 | Peisa | H04B 17/309 |
| 2019/0268830 A1* | 8/2019 | Kim | H04W 36/0077 |
| 2019/0297598 A1* | 9/2019 | Li | H04W 48/10 |

OTHER PUBLICATIONS

Samsung, "On Demand SI Delivery: Signaling Aspects", R2-1700011, 3GPP TSG-RAN WG2 NR Spokane, USA, Jan. 17-19, 2017 (Year: 2017).*

Xiaomi, "SI Request Mechanism for On demand SI," 3GPP TSG-RAN WG2 NR Ad Hoc, R2-1700038, Agenda Item: 3.2.2.4, Spokane, WA, Jan. 17, 2017, pp. 1-4, 3GPP.

Samsung, "Minimum System Information," 3GPP TSG-RAN WG2 Meeting NR, R2-1700309, Agenda Item: 3.2.2.4, Spokane, WA, Jan. 17, 2017, pp. 1-5, 3GPP.

3rd Generation Partnership Project, "3rd Generation Partnership Project; Technical Specification Group Radio Access Network; Study on New Radio Access Technology; Radio Interface Protocol Aspects (Release 14)", Technical Report, 3GPP TR 38.804 V0.7.1, Mar. 1, 2017, pp. 1-56, 3GPP.

* cited by examiner

ON-DEMAND SYSTEM INFORMATION REQUESTS AND TRANSMISSIONS

RELATED APPLICATIONS

This application claims priority to International Patent Application Number PCT/CN2017/078195, filed 24 Mar. 2017, the disclosure of which is incorporated by reference herein in its entirety.

TECHNICAL FIELD

The present disclosure generally relates to wireless communication between a radio device and a network node of a wireless communication network, and more particularly relates to exchanging a set of system information between the network node and radio device separately responsive to a condition being met.

BACKGROUND

In many wireless communication systems, efficient use of carrier resources is a general design goal. For example, a wasteful system design may include transmissions that needlessly occupy valuable carrier resources and/or interfere with more critical signaling. Efficient systems may eliminate, or reduce the negative impact of, such transmissions, while in many cases continuing to meet certain functional requirements.

SUMMARY

Embodiments of the present disclosure generally relate to a network node that provides a radio device with system information. In particular, the network node may provide a first system information set, a signal a limitation, to the radio node. The limitation may specify a condition for requesting a second system information set from the network node. For example, the condition may be that the radio device detects at least a minimum channel quality on a downlink. Such may, in some embodiments, avoid the radio device using increased radio resources by preventing the radio device from requesting transmission of the second system information set when the second system information set is not required, and/or when radio conditions are too poor for the second system information set to be received and correctly decoded by the radio device, among other things.

One or more embodiments herein include a method, implemented in or initiated by a network node. The method comprises providing a first system information set to a radio device, and signaling a limitation to the radio device. The limitation specifies a condition for requesting a second system information set from the network node.

In some embodiments, the condition for requesting the second system information set is that the radio device detects at least a minimum channel quality on a downlink.

In some embodiments, the method further comprises receiving a request, for the second system information set, requesting that the second system information set be transmitted according to a given channel quality. In some such embodiments, the request includes a transmission power used by the radio device to indicate the given channel quality. In other such embodiments, the method further comprises providing, to the radio device, an access parameter for the radio device to use to indicate the given channel quality in requesting the second system information set, and determining the given channel quality responsive to detecting that the radio node used the access parameter to transmit the request. Additionally or alternatively, the method further comprises, responsive to receiving the request, providing the second system information set to the radio node using a transmission robustness characteristic determined based on the given channel quality. In some such embodiments, the transmission robustness characteristic is a coding scheme and/or transmission power.

In some embodiments, the method further comprises selecting, based on the given channel quality, which of a broadcast transmission and a device-specific transmission to use to provide the second system information set.

In some embodiments, the method further comprises, determining, based on the given channel quality, whether to provide the second system information set repetitively.

In some embodiments, the method further comprises determining, based on the given channel quality, whether to beamform the second system information set towards the radio device.

In some embodiments, the method further comprises signaling, to the radio device, a further limitation specifying a further condition for requesting that the network node transmit the other system information using a device-specific transmission.

In some embodiments, the further comprises establishing a Radio Resource Control (RRC) connection with the radio device, receiving a further request for the second system information set over the RRC connection, and providing the second system information set to the radio device over the RRC connection in response.

In some embodiments, the first system information set comprises information for obtaining initial access to a cell and indicates that the second system information set is available separately from the first system information set.

One or more embodiments herein include a method implemented in or initiated by a radio device. The method comprises receiving a first system information set from a network node, and receiving, from the network node, a limitation specifying a condition for requesting a second system information set from the network node.

In some embodiments, the method further comprises determining whether or not to transmit a request for the second system information set based on detecting that the condition is or is not met, respectively. In some such embodiments, the method further comprising transmitting the request, wherein the request requests that the second system information set be transmitted according to a given channel quality. In a particular embodiment, the given channel quality is a channel quality detected by the radio device. In another particular embodiment, the given channel quality is worse than a channel quality detected by the radio device.

In some embodiments, the request includes a transmission power used by the radio device to indicate the given channel quality.

In some alternative embodiments, the request includes an access parameter, received from the network node, to indicate the given channel quality.

In some embodiments, the method further comprises, transmitting the request and responsive to failing to receive the second system information set within a threshold duration since the request, establishing a Radio Resource Control (RRC) connection with the network node, re-requesting the second system information set over the RRC connection, and receiving the second system information set over the RRC connection.

In some embodiments, the method further comprises receiving, from the network node, a further limitation specifying a further condition for requesting that the network node transmit the second system information set using a device-specific transmission, In some embodiments, the condition for requesting the second system information set is that the radio device detects at least a minimum channel quality on a downlink.

In some embodiments, the first system information set comprises information for obtaining initial access to a cell and indicates that the second system information set is available separately from the first system information set.

One or more embodiments herein also include a network node. The network node is configured to provide a first system information set to a radio device and signal a limitation to the radio device. The limitation specifies a condition for requesting a second system information set from the network node.

In some embodiments, the network node may be configured to perform any aspects of any methods described above.

One or more embodiments herein also include a radio device. The radio device is configured to receive a first system information set from a network node, and receive, from the network node, a limitation specifying a condition for requesting a second system information set from the network node.

In some embodiments, the radio device may be configured to perform any aspects of any methods described above.

Further embodiments include a computer program comprising instructions which, when executed by at least one processor of a node, causes the at least one processor to carry out the method of any of the embodiments herein.

Moreover, embodiments also include a carrier containing the computer program. The carrier may be one of an electronic signal, optical signal, radio signal, or computer readable storage medium.

One or more embodiments herein also include a signal comprising the limitation specifying the condition for requesting the second system information according to any of the embodiments herein.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to at least one of each of the items in the list (e.g., at least one of A and at least one of B).

Figure 1:
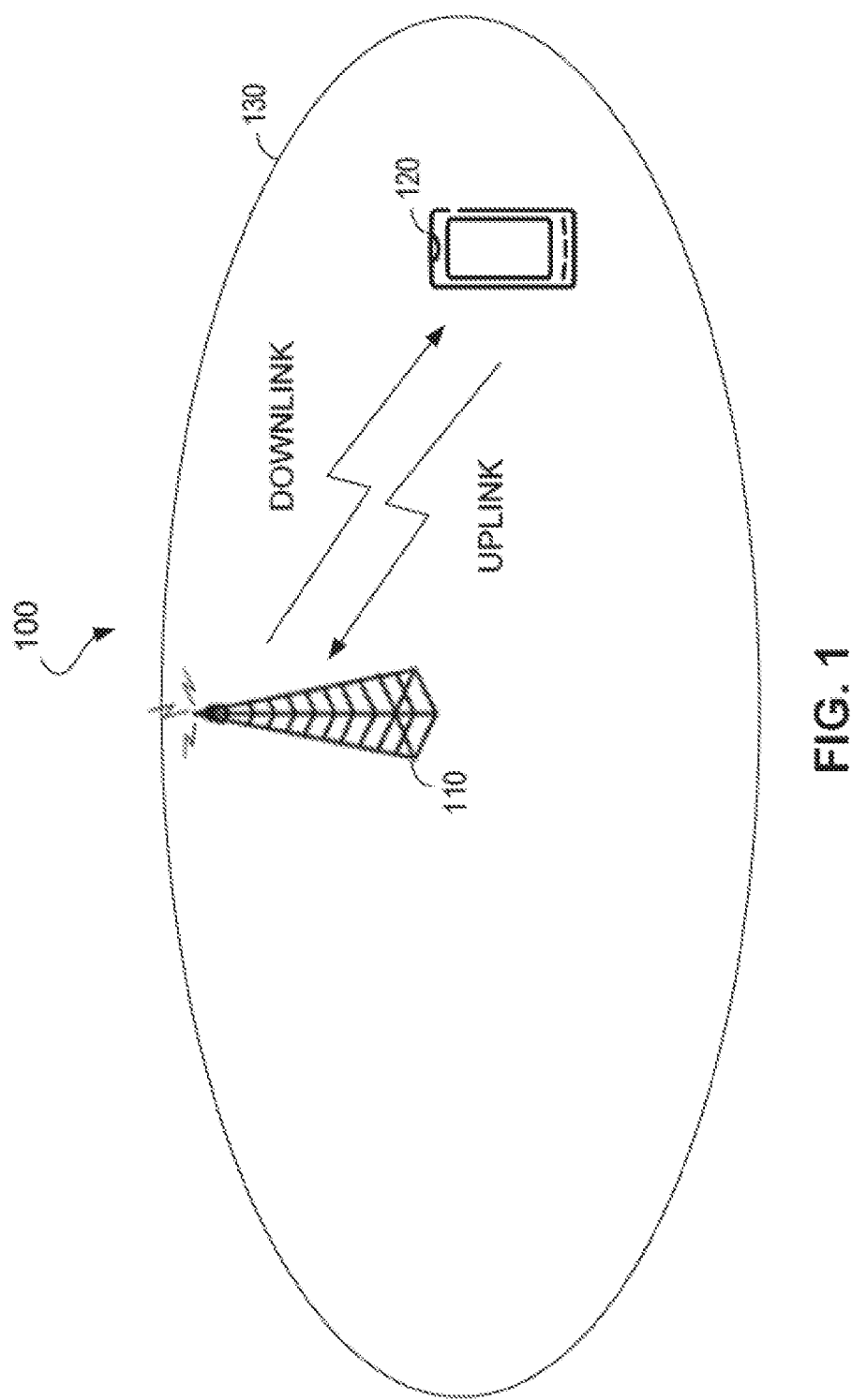
FIG. 1 is a block diagram of a wireless communication environment, according to one or more embodiments.

FIG. 1 illustrates an example network environment 100 that includes a network node 110 and a radio device 120. The network node 110 and radio device 120 are both radio nodes capable of communicating with each other over radio signals. In particular, the network node 110 may be an access node (e.g., a base station) that enables the radio device 120 to access a cell 130 of a wireless communication network. To communicate, the network node 110 transmits radio signals to the radio device 120 on a downlink, and the radio device 120 transmits radio signals to the network node 110 on an uplink, within the cell 130.

Although only one network node 110 and radio device 120 are illustrated in FIG. 1, other embodiments may include multiple radio devices in the cell 130, and broadcasts from the network node 110 may be received by any or all of those radio devices. Further, other embodiments may include other network nodes, which may or may not function similarly to network node 110 described herein. Further, although only one cell 130 is illustrated in FIG. 1, the network node 110 may support additional cells according to particular embodiments, The network node 110 may have a rather significant amount of system information with respect to, for example, one or more nodes, cells, carrier frequencies, and/or services in the wireless communication network. Although the radio device 120 may make use of some or all of this system information under the right corresponding conditions, the radio device 120 may not have a need for all of this system information at once. For example, the radio device 120 may not yet need system information pertaining to cells and/or frequencies that the radio device 120 has not yet decided to camp on. Indeed, some of the system information may never be needed by the radio device 120, in some embodiments.

Accordingly, embodiments of the present disclosure allow different sets of system information available for transmission to the radio device 120 to be transmitted separately. In particular, a first system information set including information used for obtaining initial access to the cell 130 may be periodically broadcast by the network node 110 (e.g., unsolicited by the radio device 120), whereas a second system information set may be available upon request, according to particular embodiments. The second system information set that is available may be indicated as part of the periodically broadcast system information. For example, the network node 110 may broadcast a list of system information sets (e.g., including, but not limited to, the first and/or second system information set) that may be requested. One or more of the system information sets may relate to one or more particular nodes, cells, frequencies, and/or services, any or all of which may or may not be of use to the radio device 120. Further, the requested system information set may be transmitted from the network node 110 to the radio device 120, e.g., via dedicated signaling that is specific to the requesting radio device 120, or by periodic broadcast that is provisioned upon request by the radio device 120, according to particular embodiments.

When the radio device 120 is in an RRC_IDLE or RRC_INACTIVE state, the radio device 120 may be able to request the second system information set without requiring a state transition. When the radio device 120 is in an RRC_CONNECTED mode, dedicated Radio Resource Control (RRC) signaling may be used for the request and delivery of the second system information set. The second system information set may be broadcast at configurable periodicity and for certain duration. According to embodiments, the network node 110 or other node in the wireless communication network may decide whether the second system information set is broadcast or delivered through dedicated, device-specific RRC signaling, for example.

Further, each cell (e.g., cell 130) on which the radio device 120 is allowed to camp may broadcast at least some of the first system information set, while there may be cells in the wireless communication environment 100 on which the radio device 120 cannot camp and do not broadcast any portion of the first system information set. For a cell and/or frequency that the radio device 120 does not intend to camp upon, the radio device 120 may refrain from acquiring system information of a cell and/or frequency that the radio device 120 does not intend to camp upon from another cell/frequency layer, according to embodiments. Notwithstanding, the radio device 120 may store system information from previously visited cell(s). In some embodiments, if the radio device 120 is unable to determine certain system information of a given cell (e.g., a first system information set periodically broadcast in that cell), the radio device 120 may determine that it is barred from camping on that cell. In some embodiments, it may be advantageous for the radio device 120 to quickly determine that such a cell cannot be camped on.

By providing a given system information set on request, the periodic broadcast of system information that is infrequently used by radio devices may be avoided, according to one or more embodiments. Reducing the frequency in which lesser-used system information is transmitted may free up carrier resources for more important and/or frequently-used signaling and/or reduce interference within the wireless communication environment 100, among other advantages depending on the particular embodiment.

In addition, the network node 110 may, in some embodiments, place limitations on the radio device 120 making such requests for system information. For example, the network node 110 may transmit, to the radio device 120, a limitation specifying that detecting at least a minimum channel quality (e.g., signal strength) on the downlink is a condition for the radio device 120 to request the second system information set. In response, the radio device 120 may, e.g., measure the downlink until a channel quality of at least the minimum channel quality is detected before requesting the second system information set. This may, e.g., serve to prevent the radio device 120 from requesting, and the network node 110 from transmitting, system information that is unlikely to be received and correctly decoded due to poor channel conditions.

In other cases, different mechanisms may be used to increase the range of certain transmissions, e.g., to overcome noisy channel conditions. As an example, beam-forming of the transmissions may be used for transmissions to a specific receiver (e.g., radio device 120). Such transmissions may be sent as a narrow beam directed towards the specific radio device 120. When a radio device 120 requests system information that is only provisioned on-demand, the transmission of the requested system information may be broadcast (e.g., for possible reception by a plurality of radio devices) or transmitted using signaling dedicated to the radio device 120. Dedicated signaling may be used in some embodiments as a response to particular requests, which, e.g., may be a request message sent by the radio device 120 when in an RRC_CONNECTED state or when a Message 3 is sent directly after a random access procedure. In particular, in some embodiments, the request may be contained in a Message 3, and a response may be performed, e.g., as a Message 4 in response to the Message 3.

Figure 2:
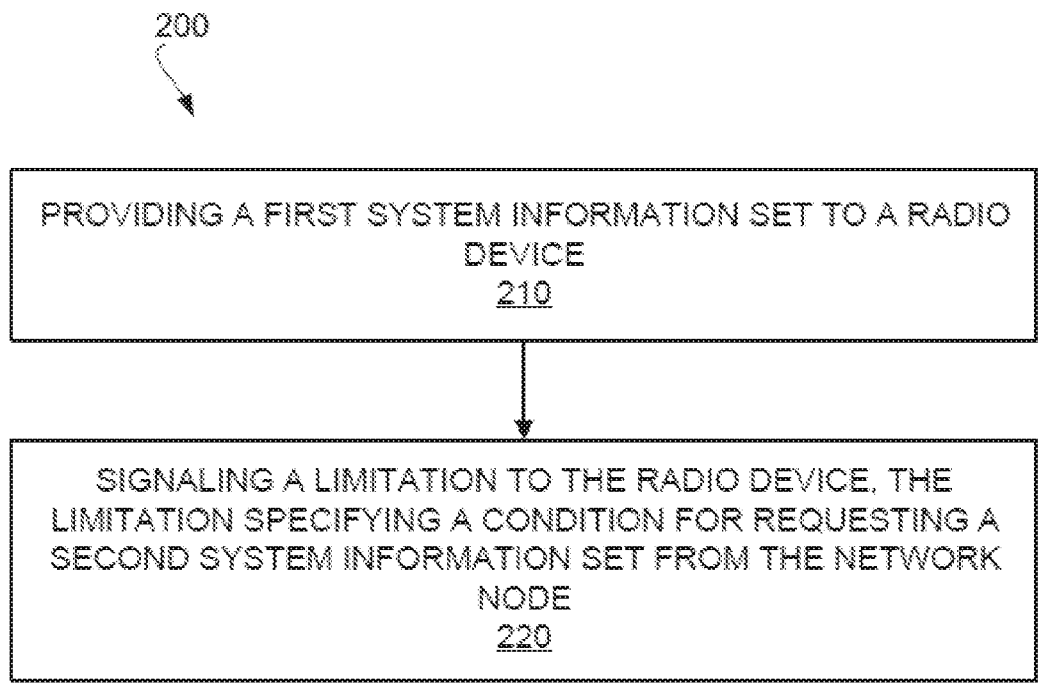
FIG. 2 is a flow diagram illustrating an example method implemented by a network node, according to one or more embodiments.

Consistent with the above, FIG. 2 illustrates a method 200 implemented by a network node 110. The method 200 comprises providing a first system information set to a radio device 120 (block 210). The method 200 further comprises signaling, to the radio device 120, a limitation specifying a condition for requesting the second system information set (block 220).

Figure 3:
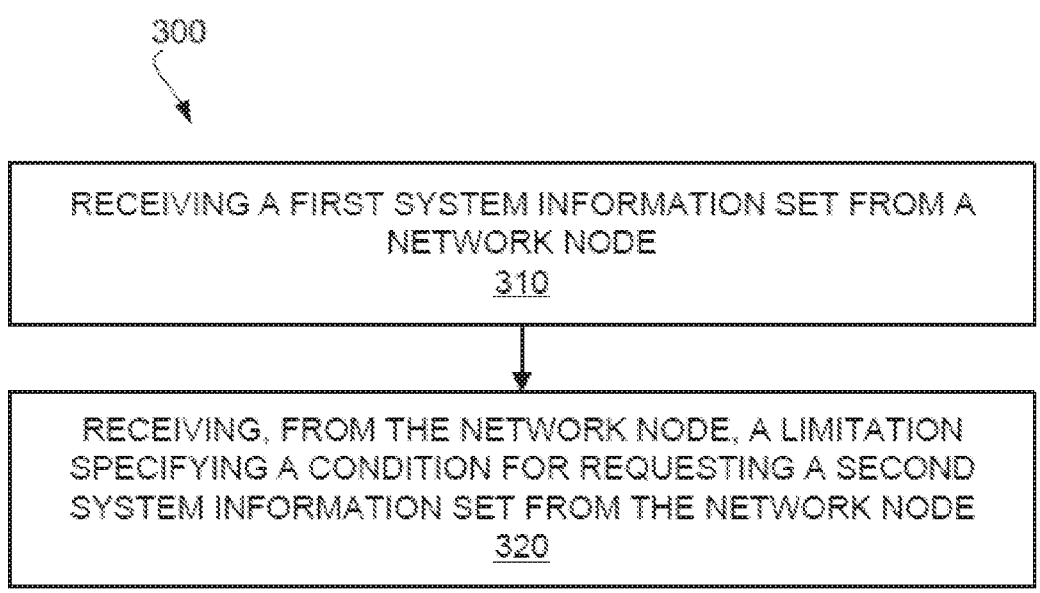
FIG. 3 is a flow diagram illustrating an example method implemented by a radio device, according to one or more embodiments.

Correspondingly, FIG. 3 illustrates a method 300 implemented by a radio device 120. The method 300 comprises receiving a first system information set from a network node 110 (block 310). The method 300 further comprises receiving, from the network node 110, a limitation specifying a condition for requesting a second system information set from the network node 110 (block 320).

In particular, the first system information set may comprise information for obtaining initial access to a cell 130 and indicate that the second system information set is available separately from the first system information set. According to embodiments, either or both of the first and second system information sets may comprise one or more elements. The radio device 120 may determine whether or not to transmit a request for the second system information set based on detecting that the condition is or is not met, respectively.

In some embodiments, the radio device's 120 request for the second system information set may indicate a given channel quality that the network node 110 may consider when determining how to transmit the second system information set to the radio device 120 in response. The network node 110 may, in response, transmit the second system information set to the radio device 120 using a transmission robustness characteristic (e.g., coding scheme, transmission power) determined based on that given channel quality.

For example, the radio device 120 may, in its request for the second system information set, request that the network node 110 transmit the second system information set according to a channel quality that the radio device 120 has detected on the downlink, e.g., by including this detected channel quality in the request for the second system information set. Alternatively, the radio device 120 may, request that the network node 110 transmit the second system information set according to a channel quality that is worse than what the radio device 120 has detected on the downlink, e.g., if the radio device 120 expects channel condition to degrade (such as if the radio device 120 is moving away from the network node 110, as just one example). If the detected channel quality is relatively poor (e.g., below a given threshold), the network node 110 may transmit the second system information set using a conservative coding scheme and/or relatively high transmission power. If the detected channel quality is relatively good (e.g., above the given threshold), the network node 110 may transmit the second system information set using a more aggressive coding scheme and/or relatively low transmission power.

The network node 110 may make other decisions with respect to how to transmit the second system information set to the radio device 120 in response to the radio device's 120 request. For example, the network node 110 may select, based on the given channel quality, whether to transmit the second system information set in a broadcast transmission or transmit the second system information set using a device-specific transmission (e.g., dedicated signaling). The network node 110 may additionally or alternatively determine whether to transmit the second system information set repetitively and/or whether to beamform the broadcast transmission towards the radio device 120, either or both of which may increase the likelihood that the radio device 120 will receive the transmission, according to embodiments.

The radio device 120 may indicate a given channel quality for the network node 110 to consider in other ways than those described above, according to particular embodiments. For example, the radio device 120 may include a transmission power (e.g., the transmission power the radio device 120 is using for uplink transmissions) in the request for the second system information set to indicate the given channel quality. As one such example, if the radio device 120 is using a relatively high or relatively low transmission power (e.g., higher or lower than a given threshold, respectively), this may indicate to the network node 110 that the uplink channel is experiencing noisy or quiet radio conditions, respectively.

In some embodiments, the network node 110 may transmit to the radio device 120 an access parameter for the radio device 120 to use to indicate the given channel quality in requesting the second system information set. For example, the network node 110 may transmit one or more access parameters to the radio device 120 along with different corresponding signal strength values, such that when any of the access parameters are used by the radio device 120 to make the request for the second system information set, the network node 110 may detect which access parameter was used and determine the corresponding given channel quality.

Examples of such an access parameter may include, for example, a random access preamble, random access occasion, value, and/or message that may be used to make the request (e.g., via random access) and/or that may be included in the request itself. Thus, according to a particular embodiment, if a first random access preamble provided by the network node 110 is used to make the request rather than a second random access preamble provided by the network node 110, the network node 110 may determine that the radio device 120 requests that the second system information set be transmitted according to a first signal quality rather than a second signal quality, respectively.

Various of the embodiments discussed above describe ways that the radio device 120 may transmit a request to indicate to the network node 110 a given channel quality so that the network node 110 may, for example, make a decision on how to transmit the second system information set based on that given channel quality. In some embodiments, the radio device 120 may additionally or alternatively request that the network node 110 use a device-specific transmission (e.g., dedicated signaling) to transmit the second system information set, e.g., in response to detecting a channel quality that is below a given threshold provided by the network node 110.

For example, in some embodiments, the network node 110 may transmit a plurality of limitations to the radio device 120, each limitation specifying a condition for requesting the second system information set. A first of the limitations may specify that the radio device 120 detecting at least a minimum channel quality on the downlink is a condition for requesting second system information set, as described above. A second of the limitations may specify that the radio device 120 detecting a channel quality on the downlink that is above the minimum channel quality and below a quality threshold is a condition for requesting that the second system information set be transmitted using a device-specific transmission. Other limitations may specify that the radio device 120 detecting a channel quality on the downlink with other attributes (e.g., above the quality threshold) are conditions for requesting that the second system information set be transmitted by the network node 110 in other ways (e.g., via a broadcast transmission, using beamforming, power boosting).

One or more such limitations may be explicitly or implicitly signaled by a radio signal sent from the network node 110 to the radio device 120, e.g., in one or more bits reserved for such purpose. According to one such embodiment, different predefined values may be represented in the signal using the one or more bits to indicate the respective limitations. The radio signal may be part of control signaling consistent with a control protocol between the network node 110 and radio device 120. For example, the radio signal may be part of Radio Resource Control (RRC) signaling exchanged between the network node 110 and radio device 120. Other examples may include other formats and/or protocols for the radio signal, according to embodiments.

As previously mentioned, network conditions may result in unsuccessful transmissions between the network node 110 and radio device 120. In some embodiments, the request from the radio device 120 for the second system information set may not be successfully received by the network node 110. In such embodiments, the network node 110 may fail to transmit the second system information set to the radio device 120 in response to the request. In some embodiments, the request may be successfully received by the network node 110 and the transmission of the second system information set by the network node 110 may not be successfully received by the radio device 120. Accordingly, in some embodiments the radio device 120 may, responsive to failing to receive the second system information set within a threshold duration since the request, establish a Radio Resource Control (RRC) connection with the network node 110, re-request the second system information set over the RRC connection, and receive the second system information set over the RRC connection.

Figure 4:
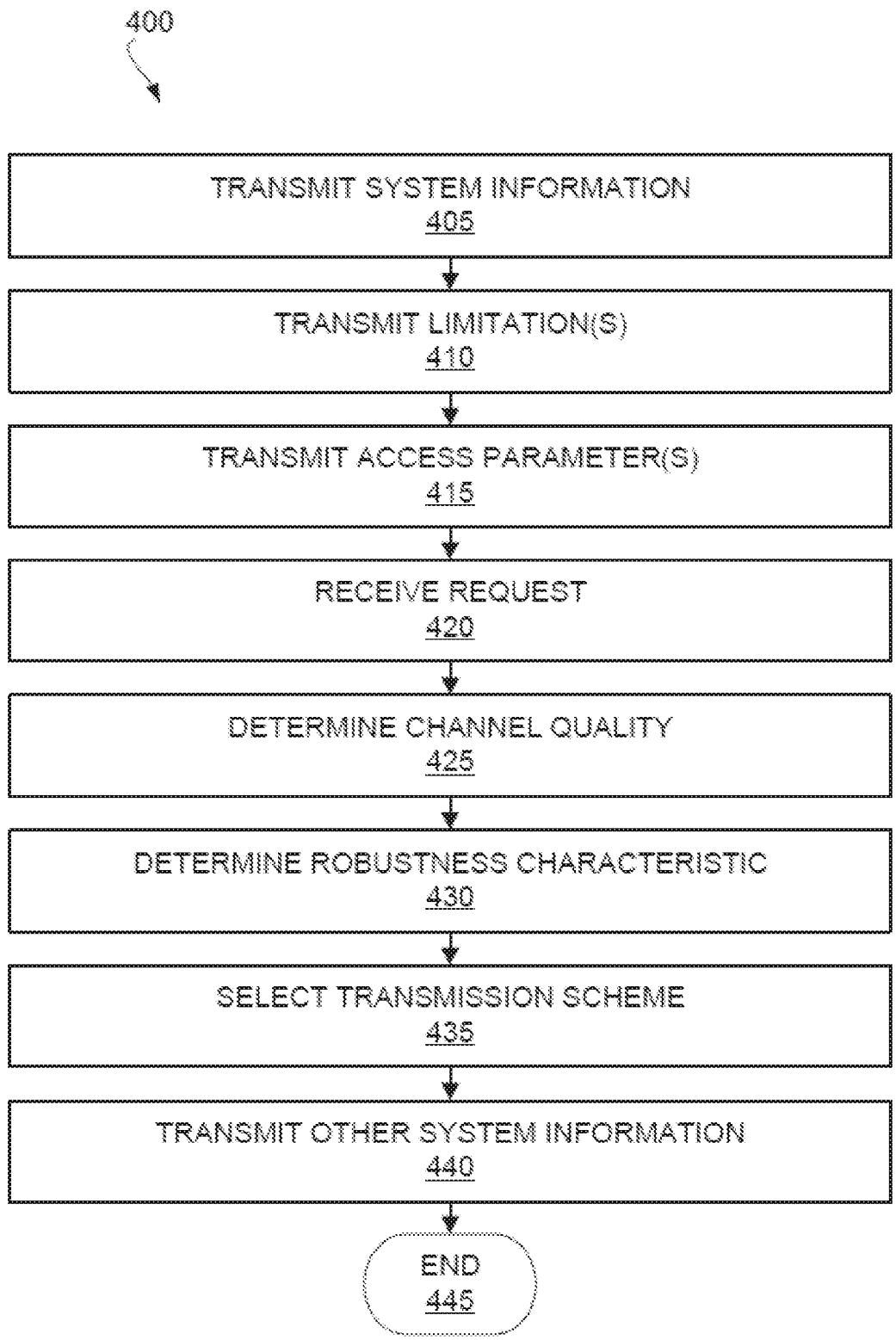
FIG. 4 is a flow diagram illustrating a further example method implemented by a network node. according to one or more embodiments.

In view of the above, embodiments of the present disclosure include the example method 400 illustrated in FIG. 4. The example method 400 may be implemented by a network node 110. According to the example method 400, the network node 110 may transmit system information, to a radio device 120. Such system information may comprise information for obtaining initial access to a cell and indicate the second system information set that is available separately from the system information (block 405). The network node 110 may further transmit, to the radio device 120, one or more limitations specifying respective conditions for requesting the second system information set (block 410). For example, as discussed above, a limitation may specify that a condition for requesting the second system information set is that the radio device 120 detect at least a minimum channel quality on a downlink over which the radio device 120 expects to receive the second system information set. Additionally or alternatively, a further limitation may specify a further condition for the radio device 120 to request that the network node 110 transmit the second system information set using a device-specific transmission. The network node 110 may further transmit, to the radio device 120, one or more access parameters for the radio device 120 to use to indicate different respective channel qualities in requesting the second system information set (block 415).

The network node 110 may further receive a request, for the second system information set, requesting that the second system information set be transmitted according to a given channel quality (block 420). In an embodiment, the given channel quality may be one of the respective channel qualities associated with a received access parameter and included in the request, for example. In another embodiment, the given channel quality may be indicated by a transmission power used by the radio device 120 and included in the request.

The network node 110 may determine the given channel quality from the request as discussed above (e.g., from information in the request, the manner in which the request was made, and/or a timing in which the request was made) (block 425). Based on the given channel quality, the network node 110 may determine a robustness characteristic (e.g., coding scheme and/or transmission power) for transmission of the second system information set (block 430). The network node 110 may additionally or alternatively select a transmission scheme, based on the given channel quality, for transmitting the second system information set (block 435). For example, the network node 110 may select, based on the given channel quality, which of a broadcast transmission and a device-specific transmission to use to transmit the second system information set. The network node 110 may additionally or alternatively determine whether to transmit the second system information set repetitively and/or determining whether to beamform the broadcast transmission towards the radio device 120, as discussed above. The network node 110 may then transmit the second system information set according to the determined robustness characteristic and selected transmission scheme (block 440). The method 400 then ends (block 445).

Figure 5:
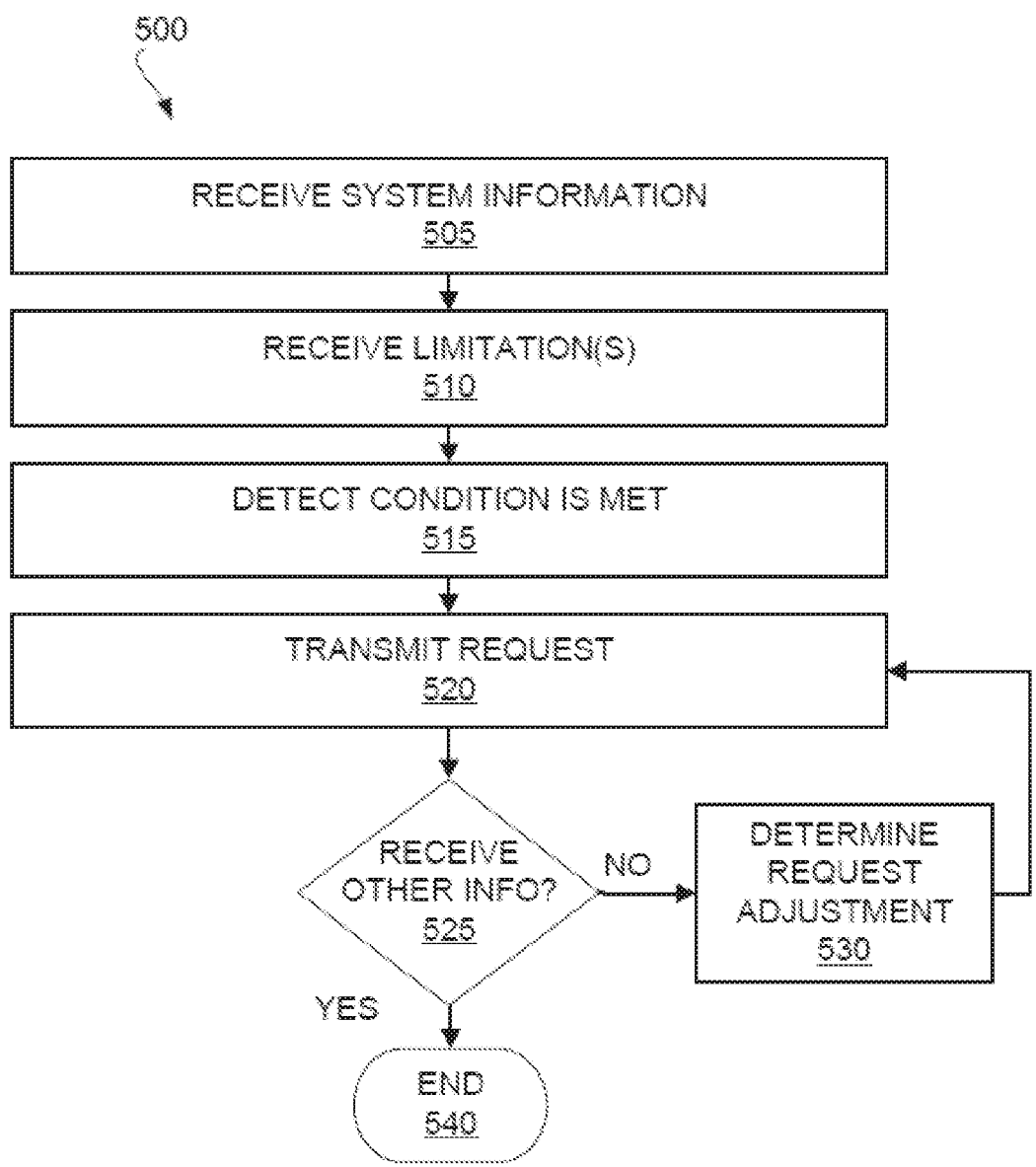
FIG. 5 is a flow diagram illustrating a further example method implemented by a radio device, according to one or more embodiments.

Embodiments of the present disclosure also include the example method 500 illustrated in FIG. 5. The example method 500 may be implemented by a radio device 120. According to the example method 500, the radio device 120 may receive system information from a network node 110 (block 505). The system information may comprise information for obtaining initial access to a cell 130 and indicate the second system information set that is available separately from the system information. The radio device 120 may receive, from the network node 110, one or more limitations specifying different respective conditions for requesting the second system information set (block 510). In some embodiments, a condition for requesting the second system information set may be that the radio device 120 detects at least a minimum channel quality on a downlink. In some embodiments, to detect the downlink channel quality, the radio device 120 may, e.g., measure the signal strength of a synchronization channel of the downlink. In some embodiments, a condition may be for requesting that the network node 110 transmit the second system information set using a device-specific transmission.

The radio device 120 detects that one or more of the received conditions is met (block 515), and in response, transmits a request for the second system information set (block 520). In some embodiments, the request for the second system information set requests that the second system information set be transmitted according to a given channel quality. In some such embodiments, the given channel quality is a channel quality detected by the radio device 120. In other such embodiments, the given channel quality is worse than a channel quality detected by the radio device 120. In some embodiments, the radio device 120 may indicate the given channel quality by including a transmission power used by the radio device 120 in the request. In some embodiments, the request may include one or more of a plurality of access parameters, received from the network node 110, to indicate the given channel quality in requesting the second system information set as discussed above.

The radio device 120 determines whether the second system information set is received within a threshold duration since the request (block 525). If so (block 525, yes), the method 500 ends (block 540). If not (block 525, no), the radio device 120 determines an adjustment to requesting the second system information set (block 530).

For example, the radio device 120 may determine that the previous request for the second system information set requested transmission of the second system information set according to a channel quality that is too high. For example, the previous request for the second system information set may have requested transmission of the second system information set according to a channel quality detected by the radio device 120 and network conditions may have subsequently worsened. As such, the radio device 120 may determine that a further request for the second system information set should request transmission according to a channel quality that is worse than the channel quality indicated by the previous request. The radio device 120 may additionally or alternatively may determine to establish a Radio Resource Control (RRC) connection for a subsequent request. In such cases, the radio device 120 may establish the RRC connection with the network node 110, re-request the second system information set over that RRC connection (including any other request adjustments determined to be applied in view of the reception failure) (block 520), and receive the second system information set over the RRC connection (block 525, yes). The method 500 then ends (block 540).

Note that a network node 110 as described above may perform the methods in FIGS. 2 and/or 4 and any other processing herein by implementing any functional means or units. In one embodiment, for example, the network node 110 comprises respective circuits or circuitry configured to perform the steps shown in FIGS. 2 and/or 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6:
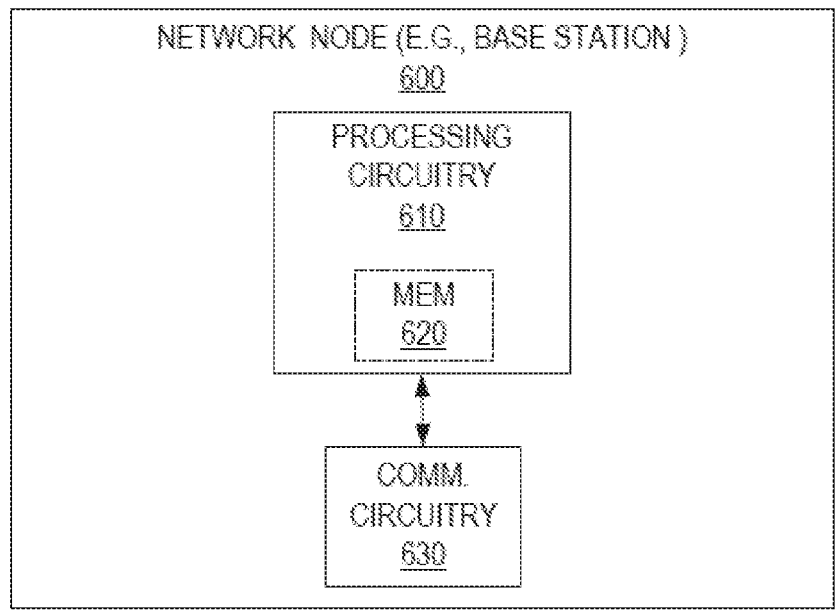
FIG. 6 is a block diagram illustrating an example network node, according to one or more embodiments.

FIG. 6 illustrates a network node 600 implemented in accordance with one or more embodiments. As shown, the network node 600 includes processing circuitry 610 and communication circuitry 630. The communication circuitry 630 is configured to transmit and/or receive information to and/or from one or more other nodes, e.g., via any communication technology. Such communication may occur via one or more antennas that are either internal or external to the network node 600. The processing circuitry 610 is configured to perform processing described above, e.g., in FIGS. 2 and/or 4, such as by executing instructions stored in memory 620. The processing circuitry 610 in this regard may implement certain functional means, units, or modules.

Figure 7:
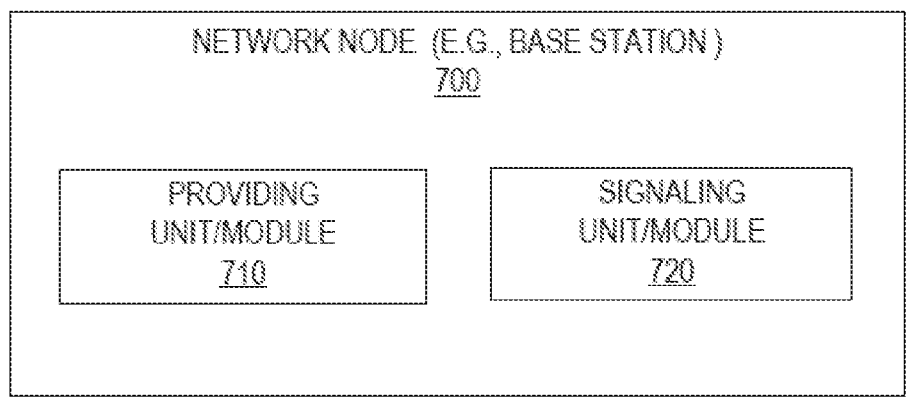
FIG. 7 is a block diagram illustrating an example network node, according to one or more embodiments.

FIG. 7 illustrates a network node 700 implemented in accordance with one or more other embodiments. As shown, the network node 700 implements various functional means, units, or modules, e.g., via the processing circuitry 610 in FIG. 6 and/or via software code. These functional means, units, or modules, e.g., for implementing the method in FIG. 2, include for instance a providing unit or module 710 for providing a first system information set to a radio device 120. Also included is a signaling unit or module 720 for signaling a limitation to the radio device 120. The limitation specifies a condition for requesting a second system information set from the network node 700.

Figure 8:
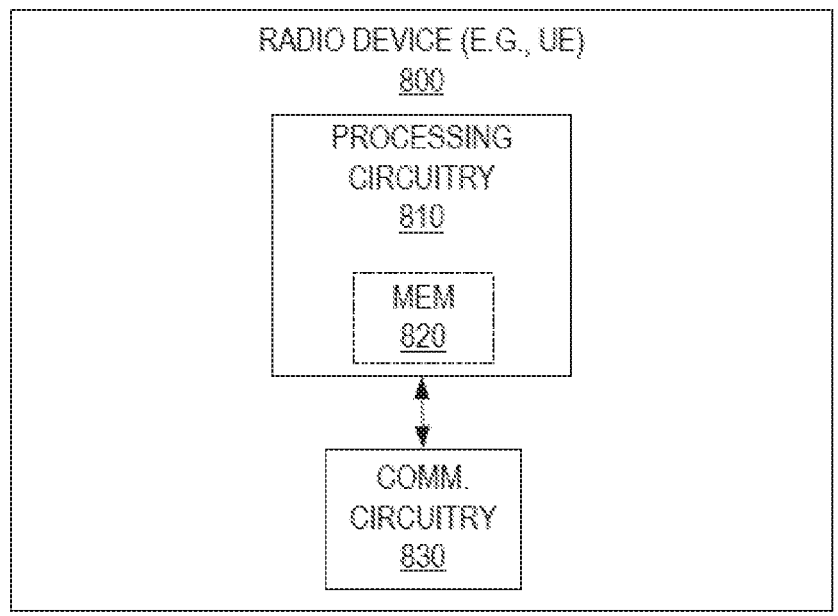
FIG. 8 is a block diagram illustrating an example radio device, according to one or more embodiments.

FIG. 8 illustrates a radio device 800 implemented in accordance with one or more embodiments. As shown, the radio device 800 includes processing circuitry 810 and communication circuitry 830. The communication circuitry 830 is configured to transmit and/or receive information to and/or from one or more other nodes, e.g., via any communication technology. Such communication may occur via one or more antennas that are either internal or external to the radio device 800. The processing circuitry 810 is configured to perform processing described above, e.g., in FIGS. 3 and/or 5, such as by executing instructions stored in memory 820. The processing circuitry 810 in this regard may implement certain functional means, units, or modules.

Figure 9:
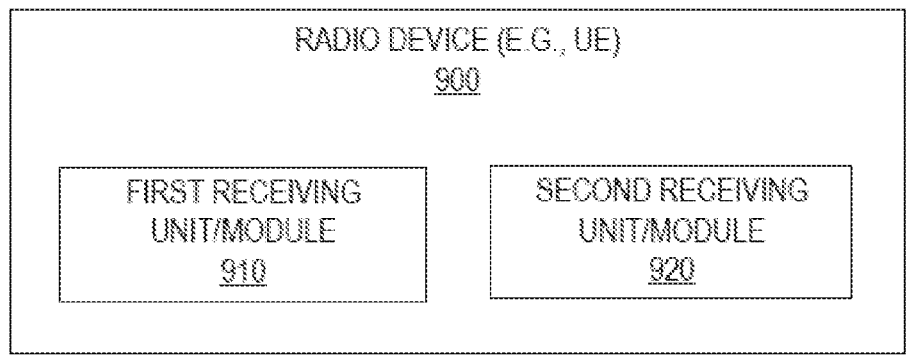
FIG. 9 is a block diagram illustrating an example radio device, according to one or more embodiments.

FIG. 9 illustrates a radio device 900 implemented in accordance with one or more other embodiments. As shown, the radio device 900 implements various functional means, units, or modules, e.g., via the processing circuitry 810 in FIG. 8 and/or via software code. These functional means, units, or modules, e.g., for implementing the method in FIG. 3, include for instance a first receiving unit or module 910 for receiving a first system information set from a network node 110. Also included is a second receiving unit or module 920 for receiving, from the network node 110, a limitation specifying a condition for requesting a second system information set from the network node 110.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

Note that a radio network node herein is any type of network node 110 (e.g., a base station) capable of communicating with another node over radio signals. A radio device 120 is any type of device capable of communicating with a radio network node over radio signals. A radio device 120 may therefore refer to a machine-to-machine (M2M) device, a machine-type communications (MTC) device, a Narrow-Band Internet of Things (NB-IoT) device, etc. The radio device 120 may also be a User Equipment (UE), however it should be noted that the UE does not necessarily have a "user" in the sense of an individual person owning and/or operating the device. A radio device 120 may also be referred to as a type of wireless device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a radio device 120 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Further, at least some embodiments herein operate based on Long Term Evolution (LTE). In addition, at least some embodiments herein operate based on New Radio (NR).

The various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, the circuits of various embodiments of the network node 110 and/or radio device 120 may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, may depend on system, product, and/or consumer-level requirements that are outside the scope of the present disclosure. One of ordinary skill in the art will readily appreciate the appropriate approaches to meeting such requirements. As such, further details of specific hardware implementations are not provided herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

The invention claimed is:

1. A method, implemented in or initiated by a network node, the method comprising:
   providing a first system information set to a radio device;
   signaling a limitation to the radio device, the limitation specifying a condition for requesting a second system information set from the network node;
   receiving a request, for the second system information set, requesting that the second system information set be transmitted according to a given channel quality.

2. The method of claim 1, wherein the condition for requesting the second system information set is that the radio device detects at least a minimum channel quality on a downlink.

3. The method of claim 1, wherein the request includes a transmission power used by the radio device to indicate the given channel quality.

4. The method of claim 1, further comprising:
   providing, to the radio device, an access parameter for the radio device to use to indicate the given channel quality in requesting the second system information set; and
   determining the given channel quality responsive to detecting that the radio device used the access parameter to transmit the request.

5. The method of claim 1, further comprising, responsive to receiving the request, providing the second system information set to the radio device using a transmission robustness characteristic determined based on the given channel quality.

6. The method of claim 1, further comprising selecting, based on the given channel quality:
   which of a broadcast transmission and a device-specific transmission to use to provide the second system information set;
   whether to provide the second system information set repetitively; and/or
   whether to beamform the second system information set towards the radio device.

7. The method of claim 1, further comprising signaling, to the radio device, a further limitation specifying a further condition for requesting that the network node transmit the second system information set using a device-specific transmission.

8. The method of claim 1, further comprising establishing a Radio Resource Control (RRC) connection with the radio device, receiving a further request for the second system information set over the RRC connection, and providing the second system information set to the radio device over the RRC connection in response.

9. The method of claim 1, wherein the first system information set comprises information for obtaining initial access to a cell and indicates that the second system information set is available separately from the first system information set.

10. A method, implemented in or initiated by a radio device, the method comprising:
    receiving a first system information set from a network node;
    receiving, from the network node, a limitation specifying a condition for requesting a second system information set from the network node;
    transmitting a request, for the second system information set, requesting that the second system information set be transmitted according to a given channel quality.

11. The method of claim 10, further comprising determining whether or not to transmit the request for the second system information set based on detecting that the condition is or is not met, respectively.

12. The method of claim 10, wherein the request includes an access parameter, received from the network node, to indicate the given channel quality.

13. A network node comprising:
    processing circuitry and a memory, the memory containing instructions executable by the processing circuitry whereby the network node is configured to:
    provide a first system information set to a radio device;
    signal a limitation to the radio device, the limitation specifying a condition for requesting a second system information set from the network node;
    receive a request, for the second system information set, requesting that the second system information set be transmitted according to a given channel quality.

14. The network node of claim 13, wherein the condition for requesting the second system information set is that the radio device detects at least a minimum channel quality on a downlink.

15. The network node of claim 13, wherein the processing circuitry further configures the network node to:
    provide, to the radio device, an access parameter for the radio device to use to indicate the given channel quality in requesting the second system information set; and
    determine the given channel quality responsive to detecting that the radio device used the access parameter to transmit the request.

16. The network node of claim 13, wherein the processing circuitry further configures the network node to, responsive to receiving the request, provide the second system information set to the radio device using a transmission robustness characteristic determined based on the given channel quality.

17. The network node of claim 13, wherein the processing circuitry further configures the network node to select, based on the given channel quality:
    which of a broadcast transmission and a device-specific transmission to use to provide the second system information set;
    whether to provide the second system information set repetitively; and/or
    whether to beamform the second system information set towards the radio device.

18. A radio device comprising:
processing circuitry and a memory, the memory containing instructions executable by the processing circuitry whereby the radio device is configured to:
receive a first system information set from a network node;
receive, from the network node, a limitation specifying a condition for requesting a second system information set from the network node;
transmit a request, for the second system information, requesting that the second system information set be transmitted according to a given channel quality.

19. The radio device of claim 18, wherein the processing circuitry further configures the radio device to determine whether or not to transmit the request for the second system information set based on detecting that the condition is or is not met, respectively.

20. The radio device of claim 18, wherein the request includes an access parameter, received from the network node, to indicate the given channel quality.

21. A non-transitory computer readable medium storing a computer program product for controlling a programmable network node in a cellular communication network, the computer program product comprising software instructions that, when run on the programmable network node, cause the programmable network node to:
provide a first system information set to a radio device;
signal a limitation to the radio device, the limitation specifying a condition for requesting a second system information set from the network node;
receive a request, for the second system information set, requesting that the second system information set be transmitted according to a given channel quality.

22. A non-transitory computer readable medium storing a computer program product for controlling a programmable radio device in a cellular communication network, the computer program product comprising software instructions that, when run on the programmable radio device, cause the programmable radio device to:
receive a first system information set from a network node;
receive, from the network node, a limitation specifying a condition for requesting a second system information set from the network node;
transmit a request, for the second system information set, requesting that the second system information set be transmitted according to a given channel quality.

* * * * *